United States Patent
Kweon et al.

(10) Patent No.: US 12,484,096 B2
(45) Date of Patent: Nov. 25, 2025

(54) AI-BASED INACTIVITY TIMER DETERMINATION METHOD AND DEVICE IN WIRELESS COMMUNICATION SYSTEM

(71) Applicant: SAMSUNG ELECTRONICS CO., LTD., Suwon-si (KR)

(72) Inventors: Kisuk Kweon, Suwon-si (KR); David Gutierrez Estevez, Suwon-si (KR); Joan Pujol Roig, Suwon-si (KR); Sangsoo Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 413 days.

(21) Appl. No.: 17/998,615

(22) PCT Filed: May 13, 2021

(86) PCT No.: PCT/KR2021/006018
§ 371 (c)(1),
(2) Date: Nov. 11, 2022

(87) PCT Pub. No.: WO2021/230684
PCT Pub. Date: Nov. 18, 2021

(65) Prior Publication Data
US 2023/0224728 A1    Jul. 13, 2023

(30) Foreign Application Priority Data

May 15, 2020  (KR) .................. 10-2020-0058607
Aug. 7, 2020  (KR) .................. 10-2020-0099251
May 13, 2021  (KR) .................. 10-2021-0061862

(51) Int. Cl.
*H04W 76/12*    (2018.01)
*H04L 69/28*    (2022.01)
(Continued)

(52) U.S. Cl.
CPC ............ *H04W 76/12* (2018.02); *H04L 69/28* (2013.01); *H04W 24/02* (2013.01); *H04W 80/10* (2013.01)

(58) Field of Classification Search
CPC . H04W 24/10; H04W 72/12; H04W 74/0808; H04W 24/02; H04W 76/12; H04W 80/10; H04L 69/28
See application file for complete search history.

(56) References Cited

U.S. PATENT DOCUMENTS 9,184,887 B2   11/2015  Kweon et al.
11,051,192 B2   6/2021  Li et al.
(Continued)

FOREIGN PATENT DOCUMENTS

WO   2019032968 A1   2/2019
WO   2019192366 A1   10/2019

OTHER PUBLICATIONS

International Search Report and Written Opinion of the International Searching Authority dated Aug. 12, 2021, in connection with International Application No. PCT/KR2021/006018, 8 pages.
(Continued)

*Primary Examiner* — Jeong S Park

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business,
(Continued)

a security and safety-related service, etc.) on the basis of 5G communication technology and IoT-related technology. A method carried out by a network data analytics function (NWDAF) device, and a device for carrying out same may be provided according to various embodiments of the present disclosure, the method comprising the steps of: acquiring, for a protocol data unit (PDU) session, traffic pattern-related information, traffic type-related information and current time-related information; determining an inactivity timer value for the PDU session on the basis of the traffic pattern-related information, traffic type-related information and current time-related information; and transmitting the inactivity timer value to a session management function (SMF) device.

14 Claims, 6 Drawing Sheets

(51) Int. Cl.
    *H04W 24/02*     (2009.01)
    *H04W 80/10*     (2009.01)

(56) References Cited

U.S. PATENT DOCUMENTS

| | | | |
|---|---|---|---|
| 2015/0055573 A1* | 2/2015 | Miklos | H04W 76/38 |
| | | | 370/329 |
| 2017/0359783 A1* | 12/2017 | Vangala | H04W 52/0258 |
| 2018/0199398 A1* | 7/2018 | Dao | H04W 76/27 |
| 2018/0262924 A1* | 9/2018 | Dao | H04W 72/535 |
| 2019/0174573 A1* | 6/2019 | Velev | H04W 80/10 |
| 2019/0222489 A1 | 7/2019 | Shan | |
| 2020/0112907 A1* | 4/2020 | Dao | H04M 15/8016 |
| 2020/0112921 A1 | 4/2020 | Han et al. | |
| 2020/0228420 A1* | 7/2020 | Dao | H04L 41/142 |
| 2020/0267182 A1* | 8/2020 | Highnam | H04L 63/0236 |
| 2021/0092609 A1 | 3/2021 | Wang | |
| 2021/0204357 A1* | 7/2021 | Tang | H04W 48/16 |

OTHER PUBLICATIONS

Vivo, "Correct the the NW-TT port related," S2-2001897, SA WG2 Meeting #137E (e-meeting), Elbonia, Feb. 24-27, 2020, 17 pages.

\* cited by examiner

AI-BASED INACTIVITY TIMER DETERMINATION METHOD AND DEVICE IN WIRELESS COMMUNICATION SYSTEM

CROSS-REFERENCE TO RELATED APPLICATIONS

This application is a 371 of International Application No. PCT/KR2021/006018 filed on May 13, 2021, which claims priority to Korean Patent Application No. 10-2020-0058607 filed on May 15, 2020, Korean Patent Application No. 10-2020-0099251 filed on Aug. 7, 2020, Korean Patent Application No. 10-2021-0061862 filed on May 13, 2021, the disclosures of which are herein incorporated by reference in their entirety.

BACKGROUND

1. Field

The disclosure relates to a communication system and to a method for controlling a tinier of a terminal. In addition, the disclosure relates to a method for configuring an inactivity timer value based on artificial intelligence (AI) to deactivate a protocol data unit (PDU) session for efficient battery consumption and network resource usage of a terminal.

2. Description of Related Art

To meet the ever increasing demand for wireless data traffic since the commercialization of 4th generation (4G) communication systems, efforts have been made to develop improved 5th generation (5G) or pre-5G communication systems. As such, 5G or pre-5G communication systems are also called "beyond 4G network system" or "post Long Term Evolution (LTE) system".

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

Additionally, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like.

Further, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

5G systems are expected to support more various services compared to existing 4G systems. For example, the most representative services may include enhanced mobile broadband (eMBB), ultra-reliable and low-latency communication (URLLC), massive machine type communication (mMTC), and evolved multimedia broadcast/multicast service (eMBMS). Also, a system providing a URLLC service may be referred to as a URLLC system, and a system providing an eMBB service may be referred to as an eMBB system. In addition, the terms "service" and "system" may be used interchangeably.

Among them, the URLLC service is a service newly considered in the 5G system, unlike the existing 4G system, and requires satisfaction of ultra-high reliability (e.g., packet error rate of about 10-5) and very low latency (e.g., about 0.5 msec) conditions compared to other services. To satisfy such strict requirements, the URLLC service may need to utilize a shorter transmission time interval (TTI) than the eMBB service, and various operation methods using this are being considered.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years.

In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

Various services can be provided according to the advancement of mobile communication systems described above, which may support diversified services and various terminals. Various traffic patterns may exist according to services, terminals, and users, and accordingly, there is a need for a method for efficiently consuming battery power of terminals and network resources by applying optimal network parameters.

SUMMARY

A technical objective to be achieved in various embodiments of the disclosure is to provide a method and an apparatus capable of effectively providing services in a wireless communication system.

Further, a technical objective to be achieved in various embodiments of the disclosure is to provide a timer control and management method for efficient battery consumption and network resource usage of a terminal.

According to an embodiment of the disclosure, there can be provided a method performed by a device of a network data analytics function (NWDAF), the method including: obtaining information on a traffic pattern, information on a traffic type, and information on a current time for a protocol data unit (PDU) session; determining an inactivity timer value for the PDU session based on the information on the traffic pattern, the information on the traffic type, and the information on the current time; and transmitting the inactivity timer value to a device of a session management function (SMF).

Further, according to an embodiment of the disclosure, there can be provided a device of a network data analytics function (NWDAF), the device including a transceiver, and a controller that is configured to obtain information on a traffic pattern, information on a traffic type, and information on a current time for a protocol data unit (PDU) session, determine an inactivity timer value for the PDU session based on the information on the traffic pattern, the information on the traffic type, and the information on the current time, and control transmitting the inactivity timer value to a device of a session management function (SMF).

According to an embodiment of the disclosure, there is proposed a method for determining a PDU session inactivity timer value using an AI technique based on a user's traffic pattern, terminal information, and cell load information.

The technical objectives to be achieved in various embodiments of the disclosure are not limited to those mentioned above, and other technical objectives not mentioned will be clearly understood by those of ordinary skill in the art to which the disclosure belongs from the following description.

According to various embodiments of the disclosure, it is possible to provide a method and apparatus for improving the performance of a terminal.

According to various embodiments of the disclosure, it is possible to provide an apparatus and method capable of efficiently improving battery consumption and network resource consumption of a terminal in a wireless communication system.

DETAILED DESCRIPTION

Figure 1:
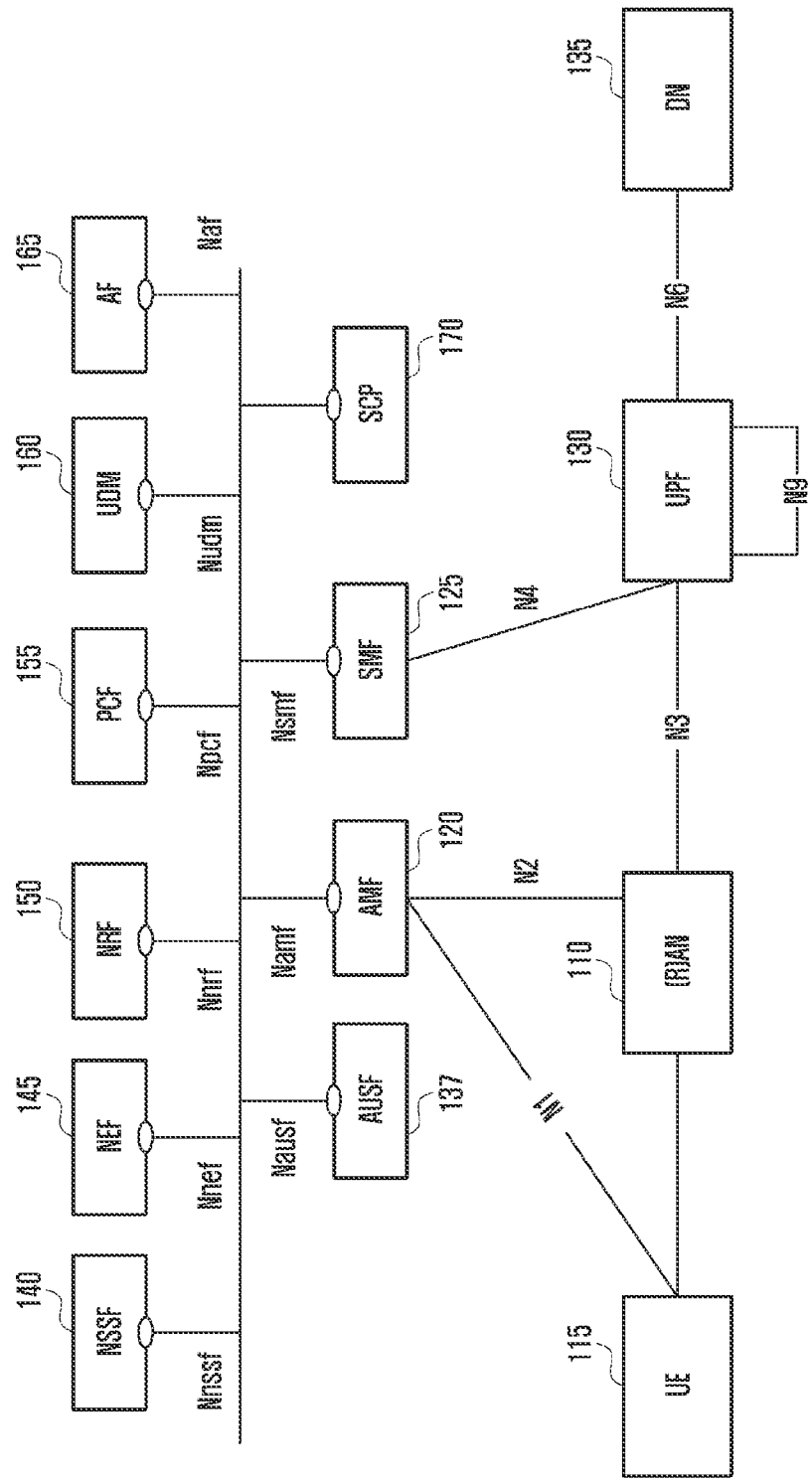
FIG. 1 illustrates the architecture of a 5G network according to an embodiment of the disclosure.

Hereinafter, exemplary embodiments of the disclosure will be described in detail with reference to the accompanying drawings. Here, it should be noted that the same components are denoted by the same reference symbols as much as possible in the accompanying drawings. In addition, detailed descriptions of well-known functions and configurations that may obscure the gist of the disclosure will be omitted.

In the following description of embodiments of the present specification, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Further, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors in a device or a secure multimedia card.

In the following description, the base station (BS), as a main agent subject that allocates resources to a terminal, may be at least one of Node B, eNode B (eNode B), gNode B (gNB), radio access unit, base station controller, or node on a network. The terminal may include a user equipment (UE), a mobile station (MS), a cellular phone, a smartphone, a computer, or a multimedia system capable of performing a communication function. In addition, the embodiment of the disclosure may be applied to other communication systems having a similar technical background or channel configuration. Further, it should be understood by those skilled in the art that the embodiment of the disclosure is applicable to other communication systems without significant modifications departing from the scope of the disclosure.

Those terms used in the following description for identifying an access node, indicating a network entity or network function (NF), indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description below, some terms and names defined in the 3rd generation partnership project (3GPP) long term evolution (LTE) standards and/or 3GPP new radio (NR) standards may be used. However, the disclosure is not limited by the above terms and names, and may be equally applied to systems conforming to other standards.

FIG. 1 illustrates the architecture of a 5G network according to an embodiment of the disclosure. The description of the network entities or network nodes constituting the 5G network is as follows.

(Radio) access network ((R)AN)) 110, as a main agent performing radio resource allocation to the UE 115, may be at least one of eNode B, gNode B, Node B, base station (BS), next generation radio access network (NG-RAN), 5G-AN, radio access unit, base station controller, or node on a network. The user equipment (UE) 115 may be at least one of terminal, next generation UE (NG UE), mobile station (MS), cellular phone, smartphone, or computer. Also, the UE may include a multimedia system capable of performing a communication function. In addition, although the embodiment of the disclosure will be described below by taking the 5G system as an example, the embodiment of the disclosure may be applied to other communication systems having a similar technical background. In addition, those skilled in the art will understand that the embodiment of the disclosure may be applied to other communication systems without significant modifications departing from the scope of the disclosure.

As the wireless communication system evolves from a 4G system to a 5G system, a new core network called NextGen core (NG core) or 5G core network (5GC) is defined. In the new core network, all the existing network entities (NEs) are virtualized into network functions (NFs). According to an embodiment of the disclosure, a network function may mean a network entity, a network component, or a network resource.

According to an embodiment of the disclosure, the 5GC may include those NFs shown in FIG. 1. Without being limited to the illustration of FIG. 1, the 5GC may include a larger number of NFs or a smaller number of NFs compared to the NFs shown in FIG. 1.

According to an embodiment of the disclosure, the access and mobility management function (AMF) 120 may be a network function for managing the mobility of the UE 115.

According to an embodiment of the disclosure, the session management function (SMF) 125 may be a network function for managing a packet data network (PDN) connection provided to the UE 115. The PDN connection may be referred to as a protocol data unit (PDU) session.

According to an embodiment of the disclosure, the policy control function (PCF) may be a network function that applies service policies, charging policies, and PDU session policies of the mobile communication operator to the UE 115.

According to an embodiment of the disclosure, the unified data management (UDM) 160 may be a network function for storing information on subscribers.

According to an embodiment of the disclosure, the network exposure function (NEF) 145 may be a network function for providing information on the UE 115 to a server outside the 5G network. In addition, the NEF 145 may provide a function of providing information necessary for a service to the 5G network and storing it in a unified data repository (UDR).

According to an embodiment of the disclosure, the user plane function (UPF) 130 may be a function that serves as a gateway for transferring user data (PDU) to the data network (DN) 135.

According to an embodiment of the disclosure, the network repository function (NRF) 150 may perform a function of discovering an NF.

According to an embodiment of the disclosure, the authentication server function (AUSF) 137 may perform UE authentication in a 3GPP access network and a non-3GPP access network.

According to an embodiment of the disclosure, the network slice selection function (NSSF) 140 may perform a function of selecting a network slice instance to be provided to the UE 115.

According to an embodiment of the disclosure, the DN 135 may be a data network to and from which the UE 115 transmits and receives data to use a network operator's service or a 3rd party service.

According to an embodiment of the disclosure, the network data analytics function (NWDAF) 170 may collect and analyze data from multiple NFs to provide analyzed information or predicted results to other NFs. In various embodiments of the disclosure, the NWDAF 170 may be used as having the same meaning as a device performing the NWDAF function.

Figure 2:
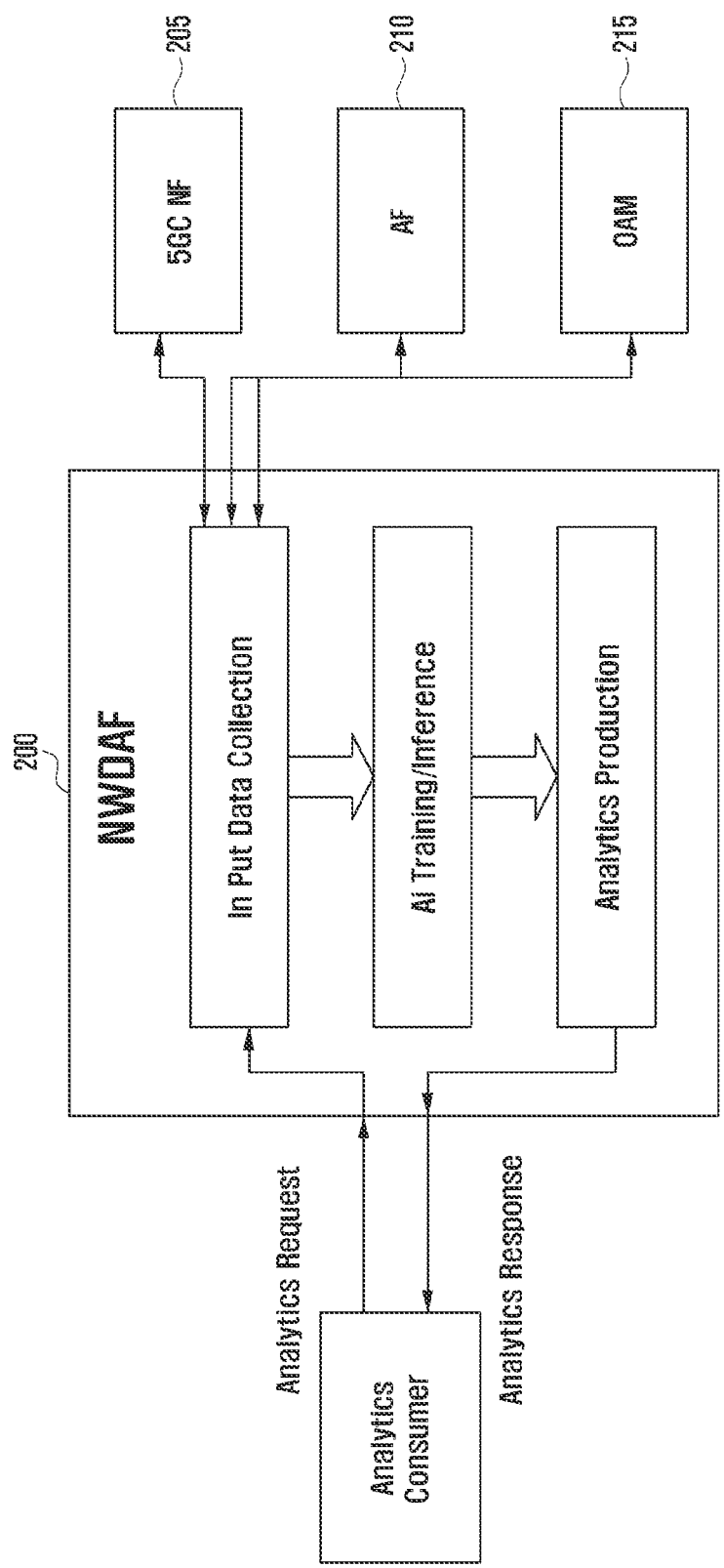
FIG. 2 is a diagram in which a network data analytics function (NWDAF) collects data from NFs, analyzes it, and provides an analysis result to a consumer NF according to an embodiment of the disclosure.

FIG. 2 is a diagram in which the NWDAF collects data from NFs, analyzes it, and provides an analysis result to a consumer NF according to an embodiment of the disclosure. In various embodiments of the disclosure, each NF may be used as having the same meaning as a device performing the function of the corresponding NF.

The NWDAF 200 collects various data as input not only from the NFs 205 inside the 5G core (5GC) but also from the AF 210 and the operations administration and maintenance (OAM) 220 outside the 5GC.

Analysis result values are derived from the collected data through an analysis module inside or outside the NWDAF 200. The analysis module analyzes the collected data through an AI technique to derive an analysis result value.

Consumer NFs request analyzed results from the NWDAF 200 and receive the analyzed results. The analyzed results can be used to optimize various network operations.

Figure 3:
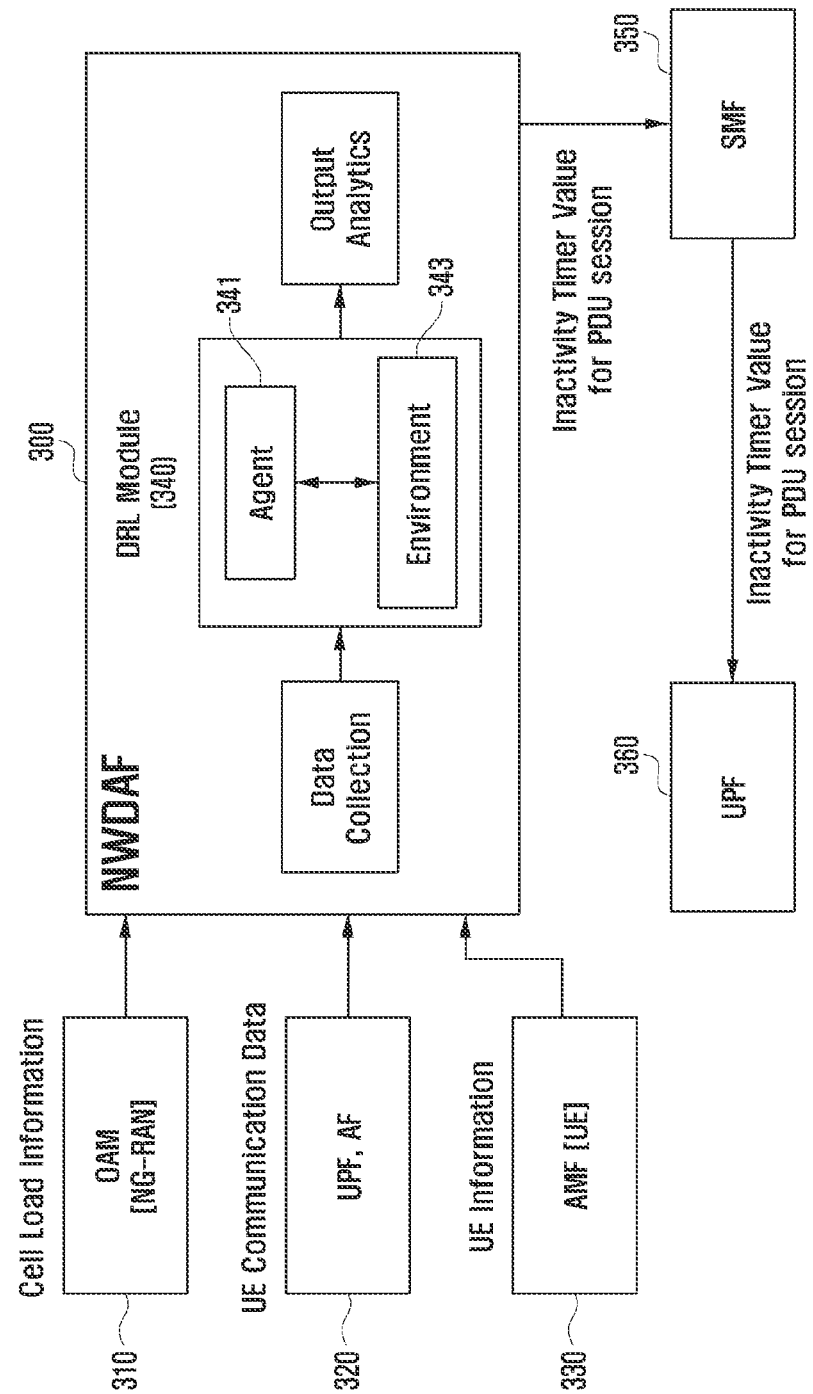
FIG. 3 is a diagram illustrating an AI-based method for determining a PDU session inactivity timer value according to an embodiment of the disclosure.

FIG. 3 is a diagram illustrating an AI (NWDAF)-based method for determining a PDU session inactivity timer value according to an embodiment of the disclosure.

The inactivity timer is run for each PDU session; when uplink or downlink traffic occurs at the corresponding PDU session, the inactivity timer is restarted, and when no new traffic is generated until the inactivity timer expires, the corresponding PDU session may be deactivated. When a PDU session is deactivated, CP related information of the PDU session is maintained, but UP related information thereof may be released or deleted.

In an embodiment of the disclosure, the NWDAF 300 may collect cell load information from the OAM 310 or the NG-RAN 310. Also, the NWDAF 300 collects UE communication data information from the UPF 320 and the AF 320. The UE communication data may include information for determining a traffic pattern of the UE and information for determining a traffic type of the UE. In addition, the NWDAF 300 may collect UE information from the AMF 330 or the UE.

In the NWDAF 300, there is an AI module based on deep reinforcement learning (DRL). The DRL technique is based on policy evaluation and improvement. That is, it evaluates the derived result, operates in a direction of increasing the evaluated value, and improves the analysis algorithm until the evaluated value becomes the highest. As shown in the drawing, there are an agent (or, agent module) 341 and an environment (or, environment module) 343 in the DRL module 340; the agent 341 provides the analyzed result to the environment 343, and the environment 343 evaluates the analyzed result and provides the evaluated value back to the agent 341. To utilize the DRL technique, the following three elements should be defined. State space, action space, and reward function. In an embodiment of the disclosure, the state space, action space, and reward function are defined as follows.

(1) State Space Variables at Time t, s (t)

The following traffic pattern information, traffic type information, and current time information may be input values for obtaining an inactivity timer value.

Traffic pattern information. The traffic pattern information may be state information of a PDU session. For example, the state information of a PDU session may be state information on activation/inactivation of the PDU session for preset time slots. For example, state information of a PDU session for 10 time slots may be used, and the length of preset time slots is not limited thereto. The length of time slots for determining the traffic pattern may be set to a different value according to the traffic type. The slots for identifying the traffic pattern may be a traffic pattern for a preset number of time slots before the time point for inputting traffic pattern information. For example, if traffic pattern information is input at time n and the number of preset time slots is 10, the traffic pattern for slot n−10 to slot n−1 may be used. Further, an offset time for determining an input value may be used. For example, when an offset of k slots is applied, the traffic pattern may be determined based on n-k slots. When a traffic pattern is used as an input value, it is possible to obtain an optimal inactivity timer value according to the traffic pattern.

For example, if 10 time slots are used, the state information of each PDU session may be a binary vector of length 10 corresponding to the last 10 time slots. The value of the vector position equals 1 if the PDU session has been activated, and 0 if the PDU session has been deactivated.

—Type of traffic (web, FTP, video, etc.)

A one-hot encoding vector that categorizes the type of traffic supported by the PDU session (web, FTP, video, etc.)

When a traffic type is used as an input value, it is possible to obtain an optimal inactivity timer value according to the traffic type.

Current time (current hour of the day)

When the current time value is used as an input value, it is possible to obtain an optimal inactivity timer value reflecting time characteristics. As described above, to obtain an inactivity timer value, at least one parameter among traffic pattern, traffic type, and current time may be used as an input value. On the other hand, to obtain an inactivity timer value, additional parameters in addition to the above three parameters may be considered, and for example, information such as the type of UE may be considered. The type of UE may include a UE type such as normal UE, machine type communication (MTC) UE, or V2X UE.

(2) Action Space at Time t, a (t)

The NWDAF 300 may obtain or determine an inactivity timer value by using the state space variable. The NWDAF 300 may determine an inactivity timer value when the PDU session is transitioned from deactivated state to activated state. The NWDAF 300 may determine a specific inactivity timer value from a set of preset timer values based on the input value of the state space variable.

The agent takes an action when the PDU session is activated.

The action space is a discrete set of timer values, $a \in A$ $$A=\{5,10,15,20,25,30,35,40,45,50\}$$

The timer value of set A is not limited to the above example. Values of set A may be defined as different values according to the traffic pattern, traffic type, UE type, or the like.

The determined inactivity timer value may be provided to the SMF.

(3) Reward Function at Time t, R (t)

When an inactivity timer value is determined in the action space at time t, a (t), the evaluation and function may be performed for the inactivity timer value. Thereby, it is possible to check whether the determined inactivity timer value is an appropriate inactivity timer value. For example, when the value of R(t) is high in the reward function below, it can be evaluated that an appropriate inactivity timer value has been determined for the corresponding state space variable.

$$R^{(t)} = \begin{cases} 2, & \text{if } g(t) < 0.005 \\ 1, & \text{if } 0.05 \leq g(t) < 0.1 \\ 0, & \text{if } 0.1 \leq g(t) < 0.5 \\ -1, & \text{otherwise} \end{cases} - a \sum \text{active}_{PDU} \quad (5)$$

For example, g(t) is the ratio between the number of time slots that the PDU session has been active while no data has been transmitted divided by the number of time slots between two consecutive actions.

Finally, there is a PDU session inactivity timer value provided to the SMF 350, which is a consumer NF. This value is the same as the value of the action space. That is, when the PDU Session is activated, the NWDAF 300 provides this value to the SMF 350 and this value is forwarded to the UPF 360.

The environment 343 calculates a reward value through the reward function to evaluate the provided inactivity timer value. In the end, the AI module finds an optimal inactivity timer value through training so as to find the inactivity timer value that makes this reward value the highest. For example, when an inactivity timer value is determined, the reward function may be evaluated to obtain a reward value, and a reward value can be obtained for a state space variable input value of each event. When different inactivity timer values are determined for similar state variable input values and data of reward values therefor are accumulated, by averaging these, it is possible to determine an inactivity timer value having a high average reward value for the state variable input value. According to an embodiment of the disclosure, the NWDAF 300 may use not only the aforementioned state space variables but also previously obtained reward values; hence, when a new state space variable is input, the NWDAF 300 may determine an appropriate inactivity timer value by utilizing data of optimal reward values for similar state variables as well as the new state space variable.

The optimal inactivity timer value may mean a value that minimizes not only battery consumption of the UE but also control signaling of the network.

Figure 4:
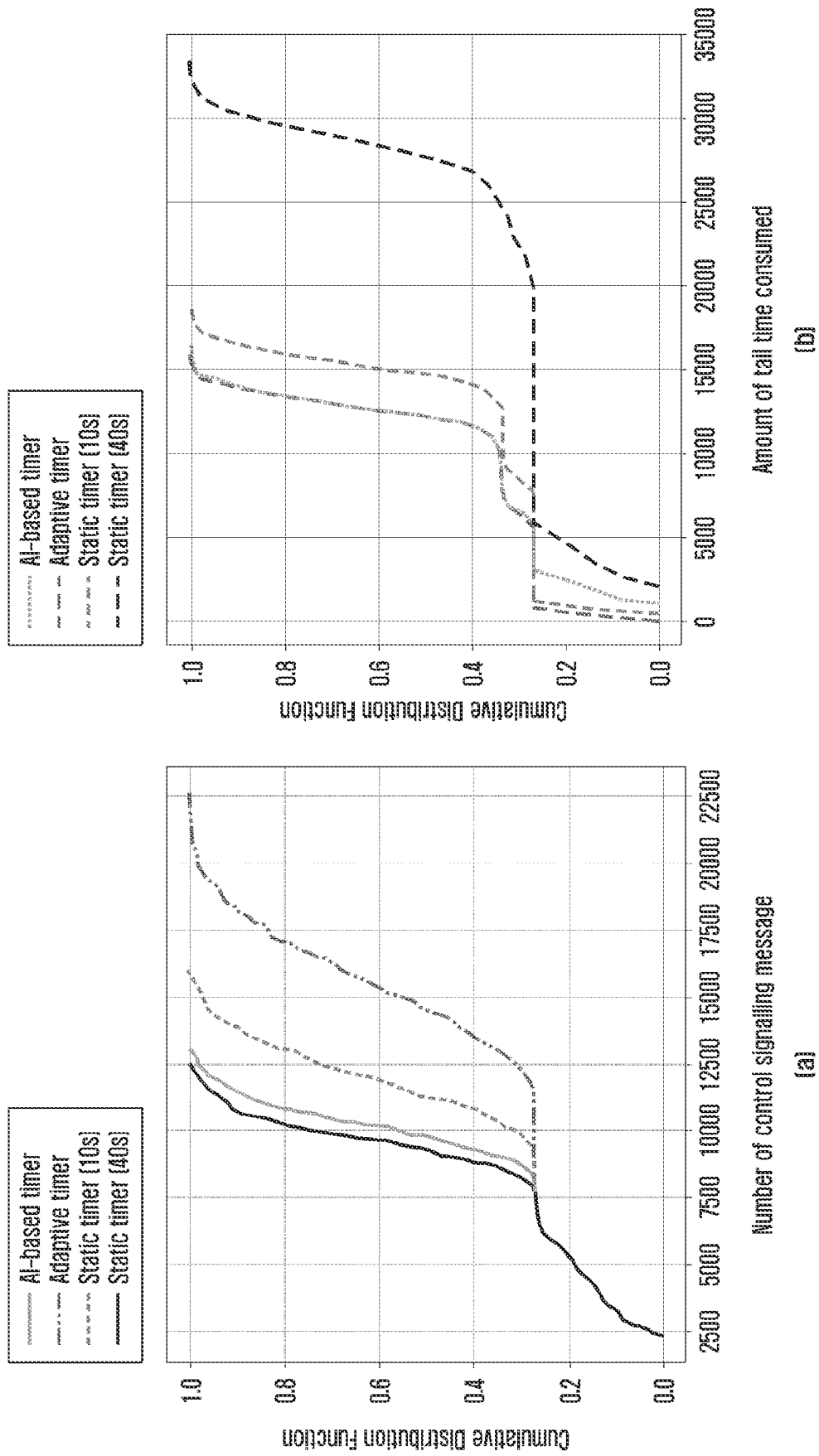
FIG. 4 illustrates a performance evaluation according to an embodiment of the disclosure.

FIG. 4 illustrates a performance evaluation according to an embodiment of the disclosure.

The AI-based timer is a case in which the inactivity timer value according to an embodiment of the disclosure is applied. In the case of part (a), according to the experimental results, the number of reconnections is reduced by about 60% compared to the existing static timer. When the number of reconnections is large, the value of the number of control signaling message may increase. Here, it can be confirmed that applying the embodiment of the disclosure is more effective than applying a static timer of 10 seconds. On the other hand, in the case of 40 seconds, the number of control signaling messages is small, but as can be seen in part (b), since the amount of the wasted slot is large, it cannot be said to be more efficient than the method of the disclosure. In the case of part (b), a large value of the amount of tail time consumed means that the amount of the wasted time slot is large. According to an embodiment of the disclosure, wasted time slots are reduced by about 22%. That is, it can be seen that using the method according to an embodiment of the disclosure is more effective in reducing wasted slots than when a static timer of 10 seconds is used. As such, when the inactivity timer value is determined according to an embodiment of the disclosure, it is possible to reduce network control signaling by reducing the state transition (activation-deactivation state transition) of the PDU session, and it is also possible to reduce the time the UE wastes battery power by turning on the modem in the absence of data transmission.

Figure 5:
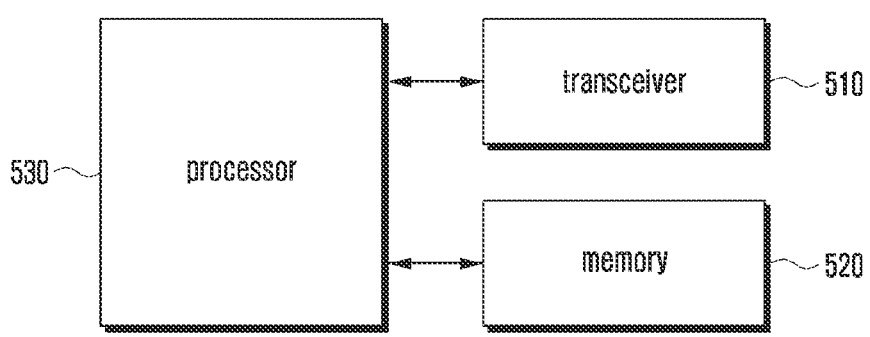
FIG. 5 is a diagram showing the structure of an NF according to an embodiment of the disclosure.

FIG. 5 is a diagram showing the structure of an NF according to an embodiment of the disclosure.

The NF may correspond to the configuration of one of various NFs described with reference to FIGS. 2 and 3. For example, the NF of FIG. 5 may be the NWDAF in FIG. 2 or 3. With reference to FIG. 5, the NF may include a transceiver 510, a memory 520, and a processor 530. The transceiver 510, the processor 530 and the memory 520 may operate according to the NF communication method described above. However, the component of the NF is not limited to the above-described example. For example, the NF may include more or fewer components than the aforementioned components. In addition, the transceiver 510, the processor 530 and the memory 520 may be implemented in the form of a single chip. Further, the processor 530 may include one or more processors.

The transceiver 510 collectively refers to a receiver and a transmitter of the NF, and may transmit and receive a signal to and from a base station, a UE, or another NF. The signal transmitted and received to and from a base station, a UE, or another NF may include control information and data. To this end, the transceiver 510 may include an RF transmitter for up-converting and amplifying the frequency of a signal to be transmitted, and an RF receiver for low-noise amplifying a received signal and down-converting the frequency thereof. However, this is only an embodiment of the transceiver 510, and components of the transceiver 510 are not limited to the RF transmitter and the RF receiver.

In addition, the transceiver 510 may receive a signal through a radio channel and output it to the processor 530, and may transmit a signal output from the processor 530 through a radio channel.

The memory 520 may store programs and data necessary for the operation of the NE Also, the memory 520 may store control information or data included in a signal obtained by the NF. The memory 520 may be composed of storage media such as ROM, RAM, hard disk, CD-ROM, and DVD, or a combination thereof. Further, the memory 520 may be not configured separately but may be included in the processor 530.

The processor 530 may control a series of processes so that the NF may operate according to the embodiment of the disclosure described above. For example, the processor 530 may receive a control signal and a data signal through the transceiver 510 and process the received control signal and data signal. In addition, the processor 530 may transmit the processed control signal and data signal through the transceiver 510. The processor 530 may be configured in plurality, and the processor 530 may execute a program stored in the memory 520 to perform a component control operation of the NF.

In addition, the processor 530 may be configured to obtain information on the traffic pattern, information on the traffic type, and information on the current time for a protocol data unit (PDU) session, determine an inactivity timer value for the PDU session based on the traffic pattern information, the traffic type information, and the current time information, and control transmitting the inactivity timer value to a device of the session management function (SMF). The traffic pattern may be vector information corresponding to the state information of the PDU session during a preset period of slots, and the traffic type may be encoding vector information that categorizes the type of traffic of the PDU session.

The processor 530 may be configured to control determining the inactivity timer value when the state of the PDU session transitions from deactivated state to activated state. Also, the processor 530 may select the inactivity timer value from a set of preset inactivity timer values.

Also, when the value of the inactivity timer is determined, the processor 530 may be configured to control determining a reward value by using the inactivity timer value. Also, the processor 530 may determine the reward value based on the number of time slots that the PDU session has been active while no data is transmitted. The processor 530 may determine the inactivity timer value that makes the reward value the highest as an optimal inactivity timer value for the PDU session.

Also, the processor 530 may determine an inactivity timer value that makes the reward value the highest for a new input by repeating the operation of determining the inactivity timer value and the operation of determining the reward value. In addition, the processor 530 may determine the inactivity timer value based on the highest reward value among reward values obtained from input values being similar in terms of traffic pattern information, traffic type information, and current time information.

In addition, the processor 530 may be configured to control collecting cell load information, UE communication data information, and UE information, and at least one of traffic pattern information or traffic type information may be obtained from the UE communication data information.

Figure 6:
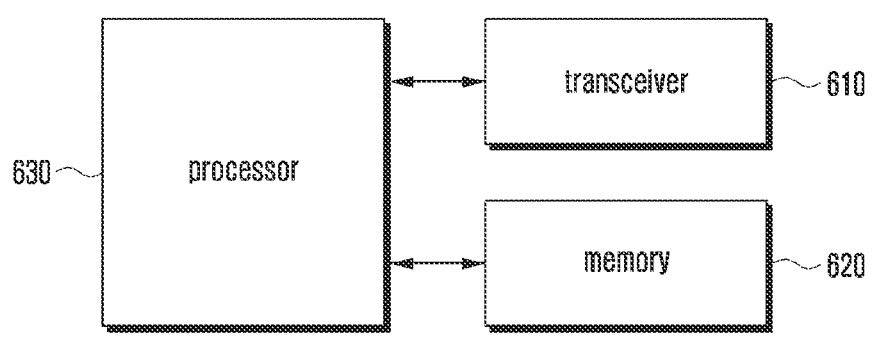
FIG. 6 is a diagram showing the structure of a UE according to an embodiment of the disclosure.

FIG. 6 is a diagram showing the structure of a UE according to an embodiment of the disclosure.

The UE described with reference to FIGS. 1 to 4 may correspond to the UE of FIG. 6. With reference to FIG. 6, the UE may include a transceiver 610, a memory 620, and a processor 630. The transceiver 610, the processor 630 and the memory 620 may operate according to the UE communication method described above. However, the component of the UE is not limited to the above-described example. For example, the UE may include more or fewer components than the aforementioned components. In addition, the transceiver 610, the processor 630 and the memory 620 may be implemented in the form of a single chip. Further, the processor 630 may include one or more processors.

The transceiver 610 collectively refers to a receiver and a transmitter of the UE, and may transmit and receive a signal to and from a base station, an NF, or another UE. The signal transmitted and received to and from a base station, an NF, or another UE may include control information and data. To this end, the transceiver 610 may include an RF transmitter for up-converting and amplifying the frequency of a signal to be transmitted, and an RF receiver for low-noise amplifying a received signal and down-converting the frequency thereof. However, this is only an embodiment of the transceiver 610, and components of the transceiver 610 are not limited to the RF transmitter and the RF receiver.

In addition, the transceiver 610 may receive a signal through a radio channel and output it to the processor 630, and may transmit a signal output from the processor 630 through a radio channel.

The memory 620 may store programs and data necessary for the operation of the UE. Also, the memory 620 may store control information or data included in a signal obtained by the UE. The memory 620 may be composed of storage media such as ROM, RAM, hard disk, CD-ROM, and DVD, or a combination thereof. Further, the memory 620 may be not configured separately but may be included in the processor 630.

The processor 630 may control a series of processes so that the UE may operate according to the embodiment of the disclosure described above. For example, the processor 630 may receive a control signal and a data signal through the transceiver 610 and process the received control signal and data signal. In addition, the processor 630 may transmit the processed control signal and data signal through the transceiver 610. The processor 630 may be configured in plurality, and the processor 630 may execute a program stored in the memory 620 to perform a component control operation of the UE.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium may be configured to be executable by one or more processors of an electronic device. The one or more programs may include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or through a communication network composed of a combination thereof. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, the embodiments of the disclosure disclosed in the present specification and drawings are only provided as specific examples to easily explain the technical details of the disclosure and to aid understanding of the disclosure, and are not intended to limit the scope of the disclosure. That is, it will be apparent to those of ordinary skill in the art that other modifications based on the technical idea of the disclosure can be carried out. In addition, some of the embodiments may be combined with each other if necessary for operation. For example, parts of distinct embodiments of the disclosure may be combined with each other and applied to a base station and a terminal. In addition, the embodiments of the disclosure are applicable to other communication systems, and other modifications based on the technical spirit of the embodiments may also be carried out.

The invention claimed is:

1. A method performed by a device of a network data analytics function (NWDAF), the method comprising:
   obtaining information on a traffic pattern, information on a traffic type, and information on a current time for a protocol data unit (PDU) session;
   determining an inactivity timer value for the PDU session based on the information on the traffic pattern, the information on the traffic type, and the information on the current time; and
   transmitting the inactivity timer value to a device of a session management function (SMF),
   wherein the inactivity timer value is determined when a state of the PDU session is transitioned from a deactivated state to an activated state.

2. The method of claim 1, wherein the traffic pattern is vector information corresponding to state information of the PDU session during a preset period of slots, and the traffic type is encoding vector information that categorizes types of traffic of the PDU session.

3. The method of claim 1, wherein the inactivity timer value is selected from a set of preset inactivity timer values.

4. The method of claim 1, wherein in case that the inactivity timer value is determined, a reward value is determined using the inactivity timer value.

5. The method of claim 4,
wherein the reward value is determined based on a number of time slots that the PDU session has been active while no data is transmitted; and
wherein an inactivity timer value that makes the reward value highest is determined as an optimal inactivity timer value for the PDU session.

6. The method of claim 4,
wherein an inactivity timer value that makes the reward value highest is determined for a new input by repeating an operation of determining the inactivity timer value and an operation of determining the reward value; and
wherein the inactivity timer value is determined based on a highest reward value among reward values obtained from input values being similar in terms of the information on the traffic pattern, information on the traffic type, and information on the current time.

7. The method of claim 1, further comprising collecting cell load information, terminal communication data information, and terminal information, and
wherein at least one of the information on the traffic pattern or the information on the traffic type is obtained from the terminal communication data information.

8. A device of a network data analytics function (NWDAF), comprising:
a transceiver; and
a controller configured to obtain information on a traffic pattern, information on a traffic type, and information on a current time for a protocol data unit (PDU) session, to determine an inactivity timer value for the PDU session based on the information on the traffic pattern, the information on the traffic type, and the information on the current time, and to transmit the inactivity timer value to a device of a session management function (SMF),
wherein the inactivity timer value is determined when a state of the PDU session is transitioned from a deactivated state to an activated state.

9. The device of the NWDAF of claim 8, wherein the traffic pattern is vector information corresponding to state information of the PDU session during a preset period of slots, and the traffic type is encoding vector information that categorizes types of traffic of the PDU session.

10. The device of the NWDAF of claim 8,
wherein the inactivity timer value is selected from a set of preset inactivity timer values.

11. The device of the NWDAF of claim 8, wherein in case that the inactivity timer value is determined, a reward value is determined using the inactivity timer value.

12. The device of the NWDAF of claim 11,
wherein the reward value is determined based on a number of time slots that the PDU session has been active while no data is transmitted; and
wherein an inactivity timer value that makes the reward value highest is determined as an optimal inactivity timer value for the PDU session.

13. The device of the NWDAF of claim 11,
wherein an inactivity timer value that makes the reward value highest is determined for a new input by repeating an operation of determining the inactivity timer value and an operation of determining the reward value; and
wherein the inactivity timer value is determined based on a highest reward value among reward values obtained from input values being similar in terms of traffic pattern information, traffic type information, and current time information.

14. The device of the NWDAF of claim 8, further comprising collecting cell load information, terminal communication data information, and terminal information, and
wherein at least one of the information on traffic pattern or the information on traffic type is obtained from the terminal communication data information.

* * * * *